United States Patent [19]
Joki

[11] Patent Number: 5,609,456
[45] Date of Patent: Mar. 11, 1997

[54] LOCKING NUT

[75] Inventor: Mark A. Joki, Dover, Ohio

[73] Assignee: The Timken Corporation, Canton, Ohio

[21] Appl. No.: 391,107

[22] Filed: Feb. 21, 1995

[51] Int. Cl.$^6$ .............................. F16B 37/08; F16B 39/22
[52] U.S. Cl. ................... 411/433; 411/291; 411/937.2
[58] Field of Search .................................... 411/432, 433, 411/290, 291, 937.2; 285/414

[56] References Cited

U.S. PATENT DOCUMENTS

| | | |
|---|---|---|
| 171,898 | 1/1876 | Wiles . |
| 518,474 | 4/1894 | Wallace . |
| 619,137 | 2/1899 | Casner . |
| 739,716 | 9/1903 | Reid . |
| 1,353,382 | 9/1920 | Crissinger . |
| 1,621,227 | 3/1927 | Wetmore . |
| 1,850,917 | 3/1932 | Browne . |
| 2,385,159 | 9/1945 | Peters . |
| 4,086,946 | 5/1978 | Keen . |
| 4,557,652 | 12/1985 | Lundgren . |
| 5,069,587 | 12/1991 | Levenstein . |
| 5,472,245 | 12/1995 | Meske et al. ................... 411/291 X |

FOREIGN PATENT DOCUMENTS

| 668722 | 11/1929 | France ................................. 411/291 |
|---|---|---|

OTHER PUBLICATIONS

Advance Machine & Engineering, Adjustable Locknuts, Spieth catalog, pp. 1–12.

*Primary Examiner*—Neill R. Wilson
*Attorney, Agent, or Firm*—Polster, Lieder, Woodruff & Lucchesi, L.C.

[57] ABSTRACT

A locking nut includes a main ring having a threaded bore, a front end face at one end of the bore and a counterbore at the other end of the bore. Actually, the threaded bore opens into the counterbore through a recess which in turn opens out of a shoulder that forms the end of the counterbore. The main ring also has threaded holes which open out of the recess around the threaded center bore. In addition to the main ring, the nut has a secondary ring which fits into the counterbore and against the shoulder of the main ring. In the region of the threaded holes the secondary ring is relieved to the extent that it has a lesser diameter than the recess. The secondary ring also has a threaded bore, the thread of which matches the thread of the bore for the main ring. Indeed, the threads for the two rings are cut in the same machining operation, so that no interruption in pitch exists between the threads of the two rings. Cap screws extend through the secondary ring at the recesses and into the threaded holes of the main ring, engaging the threads in those holes. When the cap screws are loose, the nut passes easily over the external thread of a threaded shaft or spindle. However, when the cap screws are turned down against the secondary ring, they deform the secondary ring in the region of its reliefs into the recess of the main ring, causing the threads of the secondary ring and main ring to in effect jam. The friction which develops locks the nut on the external thread.

19 Claims, 4 Drawing Sheets

LOCKING NUT

BACKGROUND OF THE INVENTION

This invention relates in general to a nut for securing a machine component on an external thread and more particularly to a locking nut which may be secured against rotation without changing its axial position, to a bearing assembly including the nut, and to a method of manufacturing the nut.

Locking nuts exist in a variety of configurations for securing machine components to spindles and shafts. One of the more important uses of locking nuts resides in holding bearings on spindles, particularly on spindles at ends of drive and steer axles for large trucks. The typical spindle on one of these axles carries two single row tapered roller bearings which are mounted in opposition, and the bearings in turn carry a hub, enabling it to rotate with minimum friction on the spindle. The inner races or cones of the bearings fit around the spindle, while the outer races or cups fit into the hub. The spindle at its end has a thread over which a nut passes, and the position to which the nut is advanced determines the setting for the bearings. Most automotive bearings are set near a condition known as zero end play, whether it be with a very slight amount of end play or a very slight amount of preload. Too much end play detracts from stability and the hub and wheel may wobble. This in turn produces excessive seal wear. Moreover, excessive end play causes the load zone in each of the bearings to concentrate at a few rollers, and this may shorten the life of the bearing. Excessive preload, or the other hand, imparts more force to the bearings and may cause the bearings to fail early.

While a variety of nuts exist for holding bearings in place on spindles, perhaps the most common is the jam nut arrangement. This basically consists of two nuts, one threaded up behind the other. Indeed, the first nut is turned down against the inner race of the outboard bearing until a desired setting is obtained. Any of several procedures are available for determining the setting. Perhaps the most basic is simply by feel. Then one can monitor the torque. One can also monitor torque and back off of a prescribed amount which is usually specified in terms of nut rotation. In any event, the first nut brings the bearing to a desired setting, and when that setting is achieved the thread of the first nut lies against the inboard flanks of the thread on the spindle, that is to say against the flanks which are presented toward the bearing. Next, with the first nut held against rotation, the second nut is advanced over the spindle and turned down tightly against the first nut, or more likely against a washer interposed between the two nuts. The threads of the second nut likewise bear against the inboard flanks of the spindle thread, and indeed the second nut drives the first nut slightly farther along the spindle—far enough to bring the thread of the first nut against the outboard flanks of the thread on the spindle. This changes the setting of the bearings and one must account for it when establishing the initial setting with the first nut. Thus, the traditional double nut arrangement does not lend itself to much precision.

Single locking nuts exist, and some of these do not change the setting of the bearings. But most single nuts require substantial machine work and are expensive to manufacture. Moreover they do not secure the nut as firmly as required in some applications. Sometimes they remain loose on the external thread, and this subjects them to vibration damage.

The present invention resides in a locking nut which, when secured against rotation, does not change its position along an external thread such as the thread of a spindle or a shaft. As such the nut is ideally suited for setting tapered roller bearings mounted in opposition on a shaft or spindle. The nut in essence includes two rings and some type of fastening device, such as cap screws, for changing the relationship between the rings. When the cap screws are backed off, the nut will turn easily on the external thread. However, when the cap screws are tightened, they deform the secondary ring and in effect jam it with respect to the main ring. The invention also resides in a bearing arrangement including the nut, in the combination of the nut and an external thread, and in a method of manufacturing the nut.

DESCRIPTION OF THE DRAWINGS

In the accompanying drawings, which form part of the specification and wherein like numerals and letters refer to like parts wherever they occur

Fib. 10 is an end view of a modified locking nut; and

Figure 10:
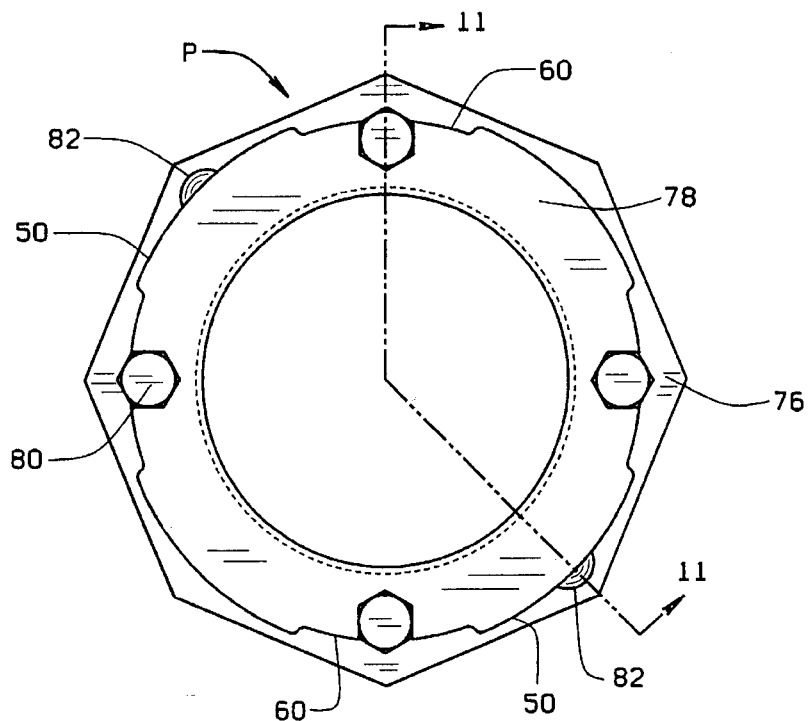
Figure 11:
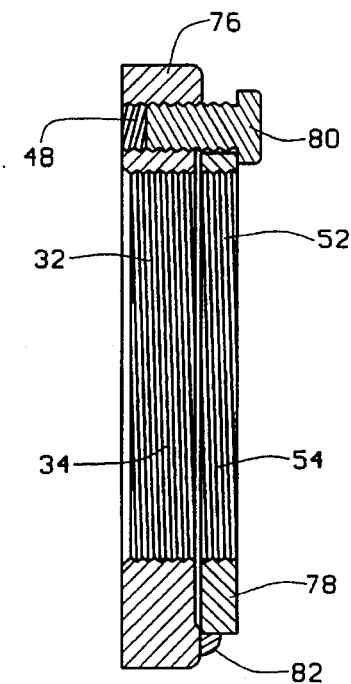

FIG. 11 is a sectional view of the modified nut taken along line 11—11 of FIG. 10.

DETAILED DESCRIPTION OF THE INVENTION

Referring now to the drawings (FIG. 1), a locking nut N threads over the end of an axle A and holds bearing B1 and B2 in place on the axle A. The bearings B1 and B2, which are mounted in opposition, in turn support a hub H, enabling the hub H to rotate relative to the axle A about an axis X, but not shift axially along the axle A. Moreover, the nut N—or more accurately the axial position it assumes—determines the setting for the two bearings B1 and B2, and that may be one of end play or preload.

The axle A at its end has a spindle 2 and slightly further inwardly a shoulder 4 from which the spindle 2 projects. The very end of the spindle 2 is provided with an external thread 6 which is engaged by the nut N. The hub H fits around the spindle 2 of the axle A and contains bores 8, which open out of its ends, and shoulders 10 at the inner ends of the bores 8. Each of the bearings B1 and B2 possesses a single row of rolling elements and raceways which are inclined or oblique with respect to the axis X. As a consequence, each bearing B1 and B2 will transmit radial loads between the axle A and hub H as well as an axial load in one direction. Since the bearings B1 and B2 are mounted in opposition, the hub H is confined both radially and axially on the axle A, but of course is free to rotate about the axis X.

Figure 1:
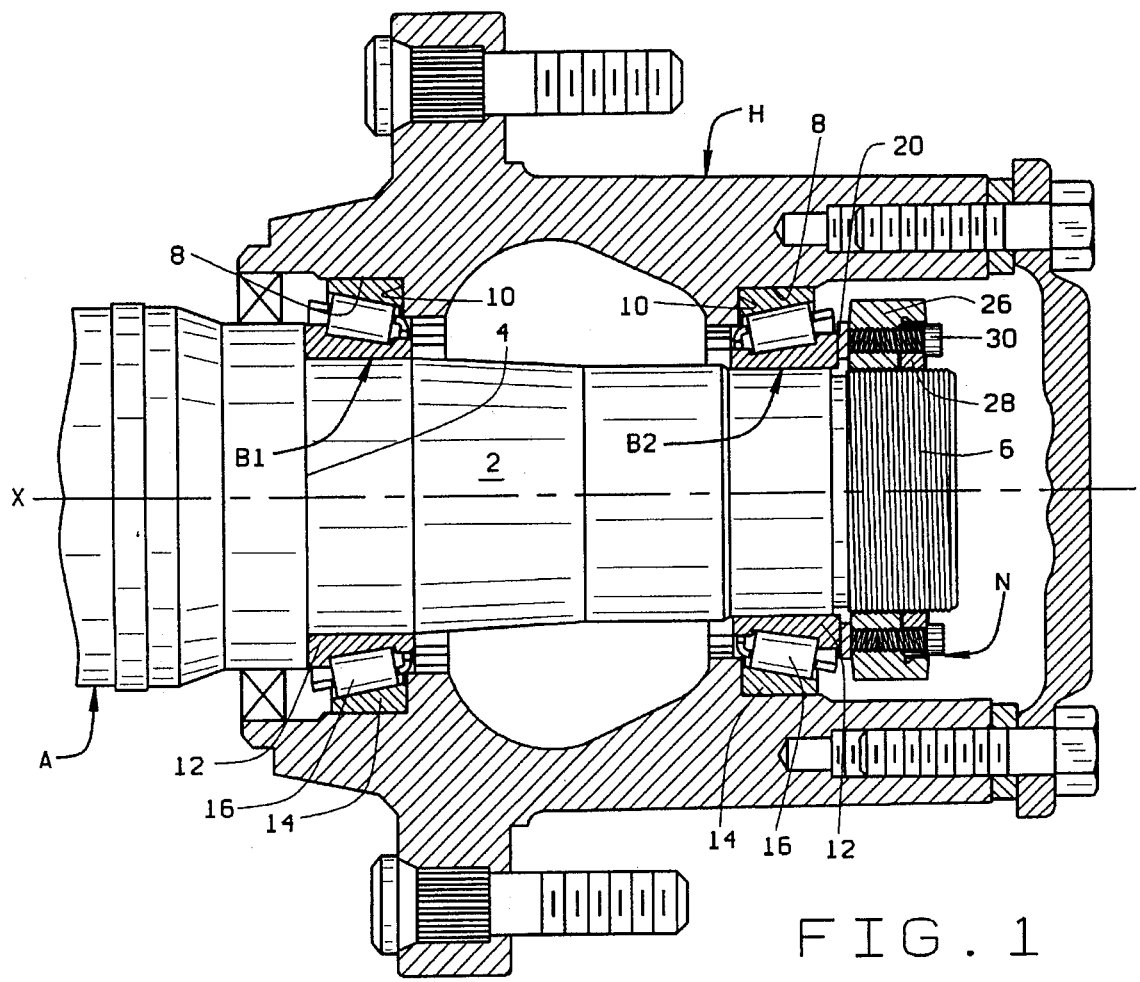
FIG. 1 is a longitudinal sectional view of a spindle and hub and tapered roller bearings located between the two, with the bearings being held in place and set with a locking nut constructed in accordance with and embodying the present invention.

Preferably, each bearing B1 and B2 is a single row tapered roller bearing. As such, each includes an inner race or cone 12, and outer race or cup 14 which encircles the cone 12, and rolling elements in the form of tapered rollers 16 arranged in a single row between the cone 12 and cup 14 (FIG. 1). Actually, the rollers 16 contact the cone 12 and cup 14 along tapered raceways on those races, with the geometry being such that the envelopes in which the raceways and side faces of the rollers 16 lie form cones having their apexes generally at a common point along the axis X. The cone 12 and cup 14 of each bearing B1 and B2 has a back face which is squared off with respect to the axis X, and through these back faces thrust loads are applied to the bearing B1 or B2. The cone 12 of the inboard bearing B1 fits around the spindle 2 with its back face against the shoulder 4. The cup 12 of the bearing B1 fits into the inboard bore 8 of the hub H with its back face against the shoulder 10 at the end of that bore 8. Likewise, the cup 14 of the outboard bearing B2 fits into the outboard bore 8 of the hub H with its back face against the shoulder 10 at the end of that bore 8. The cone 12 of the outboard bearing B2 encircles the spindle 2 adjacent to the thread 6 with its back face presented away from the shoulder 4 and generally toward the thread 6. The whole arrangement is maintained in place by the nut N which is engaged with and advanced over the thread 6 to in effect form a shoulder or stop at the back face of the cone 12 for the outboard bearing B2. Actually, the nut N may or may not contact the cone 12, depending on whether or not a washer 20 lies between the two.

Of course, the position to which the nut N is advanced over the external thread 6 determines the setting for the bearings B1 and B2. It may be advanced to a position in which the bearings B1 and B2 are actually loaded, even in the absence of a working load, this being known as preload. On the other hand, the nut N may be advanced to a position in which radial and axial clearances exist in the bearings B1 and B2, this being known as end play. Once the nut N is advanced to the desired position, whether it places the bearings B1 and B2 in preload or leaves end play, the nut N itself is internally deformed so that it becomes jammed on the threads 6 and is extremely difficult to rotate. In effect, the deformation locks the nut N on the spindle 2. But the deformation does not change the axial position of the nut N on the spindle 2 and as a consequence does not alter the setting of the bearings B1 and B2.

Figure 4:
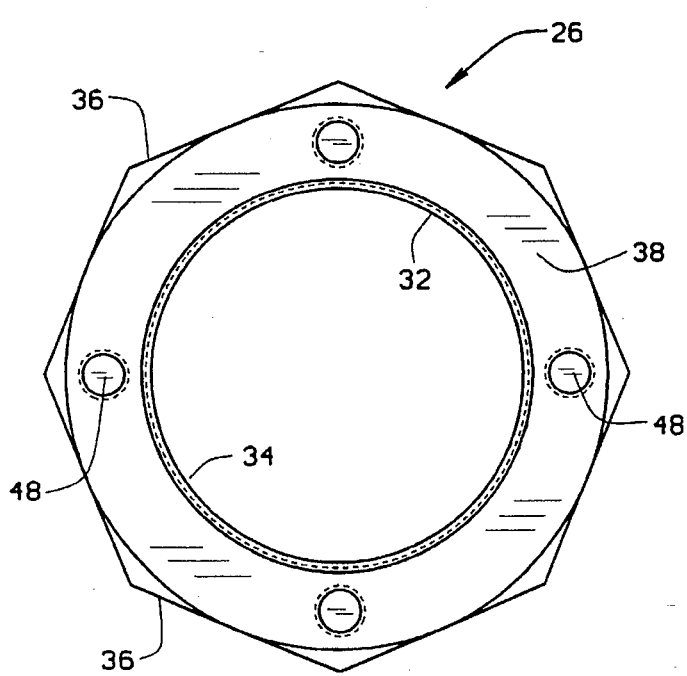
FIG. 4 is an end view of the locking nut taken along line 4—4 of FIG. 2.

The locking nut N includes (FIGS. 2–4) a main ring 26, a secondary ring 28 which fits into the main ring 26, and cap screws 30 which pass through the secondary ring 28 and into the main ring 26. Both rings 26 and 28 engage the external thread 6 of the spindle 2—indeed, with some clearance so that the nut N advances over the spindle 2 with little resistance. The cap screws 30 serve as distorting devices, for when they are turned down against the secondary ring 28, they deform the ring 28 against the thread 6 of the spindle 2 and jam the secondary ring 28 relative to the main ring 26. This secures the nut N firmly against rotation. The deformation does not change the axial position of the main ring 26.

Figure 5:
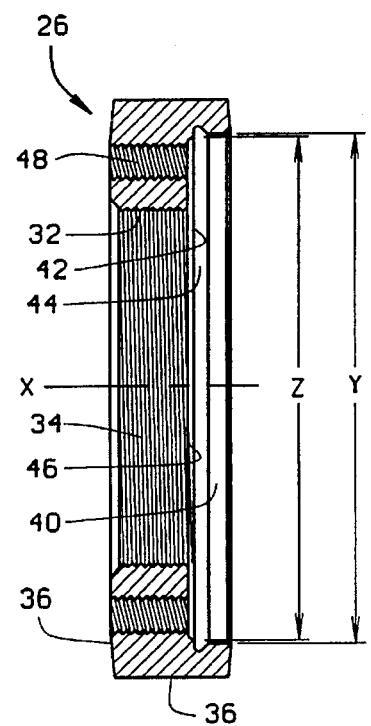
FIG. 5 is a sectional view of the main ring of the locking nut.

The main ring 26 is preferably machined from steel and includes (FIG. 5) a center bore 32 which contains a thread 34 configured to engage the thread 6 on the spindle 2, although with some clearance. Along the outer surface of the main ring 26 lie a succession of lands 36 arranged to impart an octagonal shape to the ring 26. At one end of the ring 26—the front end—an end face 38 extends between the bore 32 and the lands 36, and it is for the most part squared off with respect to the axis X. The center bore 32 extends only partially through the main ring 26, for within the ring 26 it opens into a counterbore 40 which in turn opens out of the opposite end of the ring 26. The counterbore 40 leads away from a shoulder 42 which separates the bore 32 and counterbore 40. Actually, along the shoulder 42 a slight relief 44 exists in the counterbore 40, but otherwise the counterbore 40 is cylindrical, with its center axis being the axis X. Moreover, the bore 32 does not open directly into the counterbore 40, but instead opens into it through a shallow recess 46. The counterbore 40 has a diameter y, whereas the recess 46, where it opens out of the shoulder 42, has a lesser diameter z. Finally, the main ring 26 contains threaded holes 48 which extend axially between front end face 38 and the base of the shallow recess 46.

The secondary ring 28, like the main ring 26, is formed from steel, and it occupies the counterbore 40 of the main ring 26, although it is slightly thicker than the counterbore 40 is deep so that it projects out of the counterbore 40. The secondary ring 28 (FIG. 6) has an interrupted peripheral surface 50 of cylindrical configuration, and the diameter of that surface is slightly larger than the diameter y of the counterbore 40, perhaps by as much as 0.005 inches. Hence, an interference fit exists between the two rings 26 and 28. Like the main ring 26, the secondary ring 28 has a center bore 52 along which a thread 54 exists, and that thread 54 conforms precisely to the thread 34 in the center bore 32 of the main ring 26, and indeed the thread 54 represents a continuation of the thread 34. However, the thread 54 of the secondary ring 28 contains fewer convolutions than the thread 34 of the main ring 26. Both the peripheral surface 50 and the bore 52 extend between flat end faces 56 which may be squared off with respect to the axis X.

Figures 2, 3:
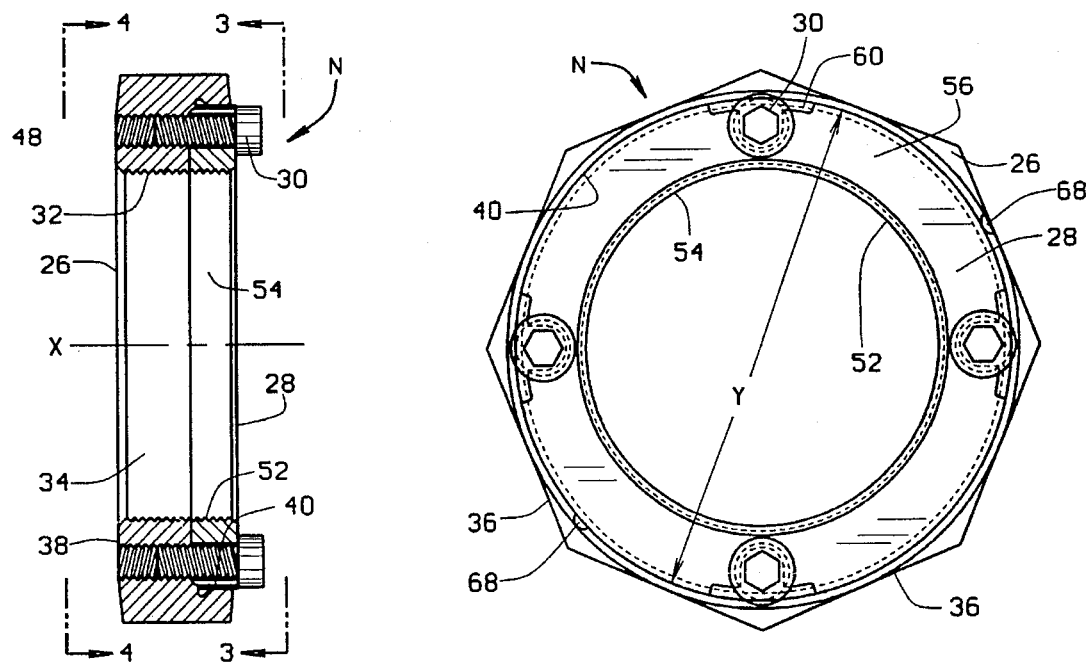
FIG. 2 is a sectional view of the locking nut.
FIG. 3 is an end view of the locking nut taken along line 3—3 of FIG. 2.
Figure 6:
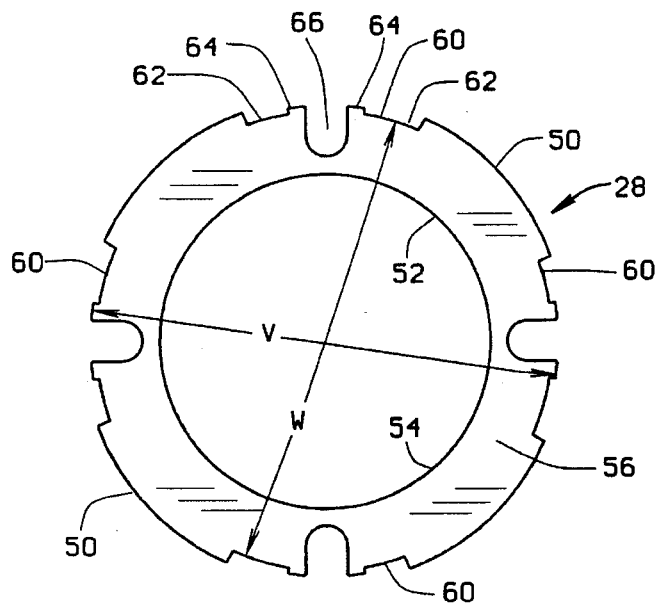
FIG. 6 is an end view of the secondary ring for the locking nut.

Being interrupted, the peripheral surface 50 does not contact the surface of the counterbore 40 for the full circumference of the counterbore 40. Indeed, it only contacts the counterbore 40 in the regions between the threaded holes 48 (FIG. 3). In the intervening regions the secondary ring 28 has arcuate reliefs 60, each of which is defined by a pair of arcuate surfaces 62, a pair of slightly raised pads 64 between the arcuate surfaces 62, and a U-shaped notch 66 separating the two pads 64 (FIG. 6). The notches 66 align with the threaded holes 48 in the main ring 26 and are large enough to receive the cap screws 30. The pads 64 lie at a diameter v which is slightly less than the diameter z of the recess 46, the difference ranging between 0.005 and 0.015 inches and preferably being 0.010 inches. The arcuate surfaces 62 lie at an even lesser diameter w, the difference between the two diameters v and w ranging between 0.020 and 0.060 inches and preferably being 0.030 inches. Each relief preferably occupies 44°. The notch 66 and the two pads 64 together occupy between 15° and 30° and preferably 23.2°.

The two rings 26 and 28 are, of course, manufactured as separate components, although their respective threads 34 and 54 are not cut at the time of manufacture. To assemble the nut N, the secondary ring 28 is forced into the counterbore 40 of the main ring 26 with the U-shaped notches 66 of the ring 28 aligned with the threaded holes 48 in the ring 26 (FIGS. 2 and 3). The secondary ring 28 advances under the force until its leading end face 56 comes against the shoulder 42 in the regions of the interrupted peripheral surface 50. Next the two rings 26 and 28 are secured firmly together at the open end of the counterbore 40 with tack welds 68 (FIG. 3). In this condition the front end face 56 of the secondary ring 28 is separated from the end of the bore 32 in the main ring 26 by about the depth of the recess 46. Indeed, a slight gap exists between the ends of the two center bores 32 and 52 and the threads 34 and 54 that extend along them, this gap representing the depth of the recess 46.

With the nut N assembled to this extent, the threads 34 and 54 are cut into the center bores 32 and 52 of the rings 26 and 28 as if the bores 32 and 52 were one. As a consequence, the thread 52 of the secondary ring 28 forms a continuation of the thread 32 for the main ring 26, that is, the two threads 34 and 54 remain consistent with no interruption in pitch in the gap between them. The two threads 32 and 52 are cut such that they will engage the external thread 6 on the spindle 20 of the axle A with the usual clearance. That clearance, when considered in terms of axial free motion, is less than the depth of the recess 46.

Finally, the cap screws 30 are inserted through the notches 66 in the secondary ring 28 and engaged with the threads in the threaded holes 48 of the main ring 26, the screws 30 are turned down lightly, yet snugly, against the back end face 56 of the secondary ring 28.

Once the bearings B1 and B2 and the hub H are installed on the spindle 2 and the washer 20 brought up against the back face of the cone 12 for the outboard bearing B2, the nut N is aligned with the spindle 2 such that the front end face 38 on the main ring 26 is presented toward the outboard bearing B2. This exposes the heads of the cap screws 30 in the opposite direction. The thread 32 in the main ring 26 is engaged with the thread 6 of the spindle 2 and the nut N is turned to advance it over the spindle 2. After several revolutions, the thread 52 of the secondary ring 28 likewise engages the thread 6 of the spindle 2. The nut N is rotated until the front face 38 of its main ring 26 bears against the washer 20 and, indeed, is turned still further until the bearings B1 and B2 acquire the desired setting.

Figure 7:
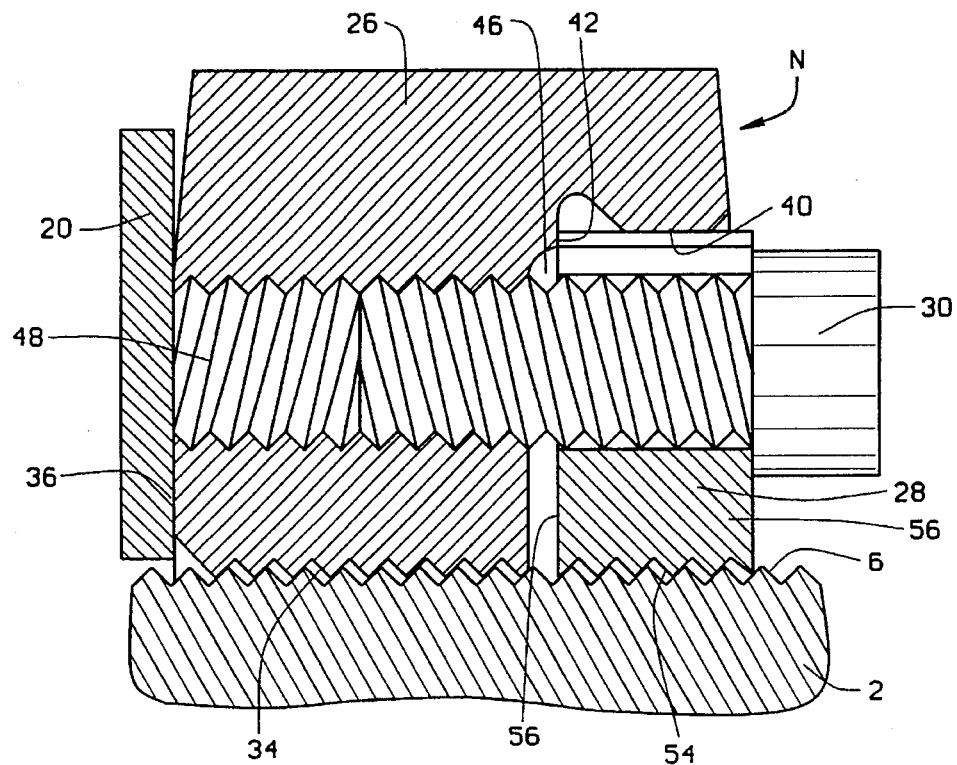
FIG. 7 is a fragmentary sectional view of the locking nut on the spindle before the secondary ring is distorted.

Irrespective of whether the setting is one of slight end play or preload, the threads 34 and 54 in the nut N bear against the inboard flanks of the threads 6 on the spindle 2, that is, the flanks which are presented toward the bearing B2 (FIG. 7). Even so, the nut N in this condition turns with relative ease on the spindle 2. To maintain the setting, one simply tightens the cap screws 30 with enough torque to deform the secondary ring 28 into the recess 46 of the main ring 26 in the region of the arcuate reliefs 60 in the secondary ring 28, with the deformation being sufficient to jam the two rings 26 and 28 on the thread 6.

Figure 9:
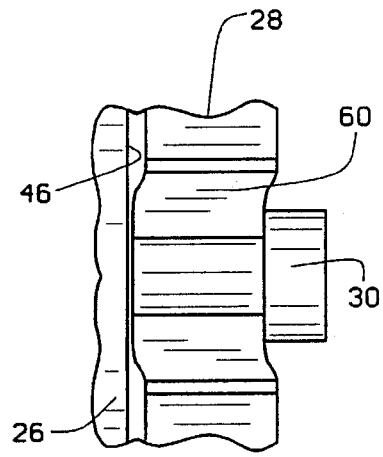
FIG. 9 is a fragmentary view of the distorted secondary ring taken along line 9—9 of FIG. 8.
Figure 8:
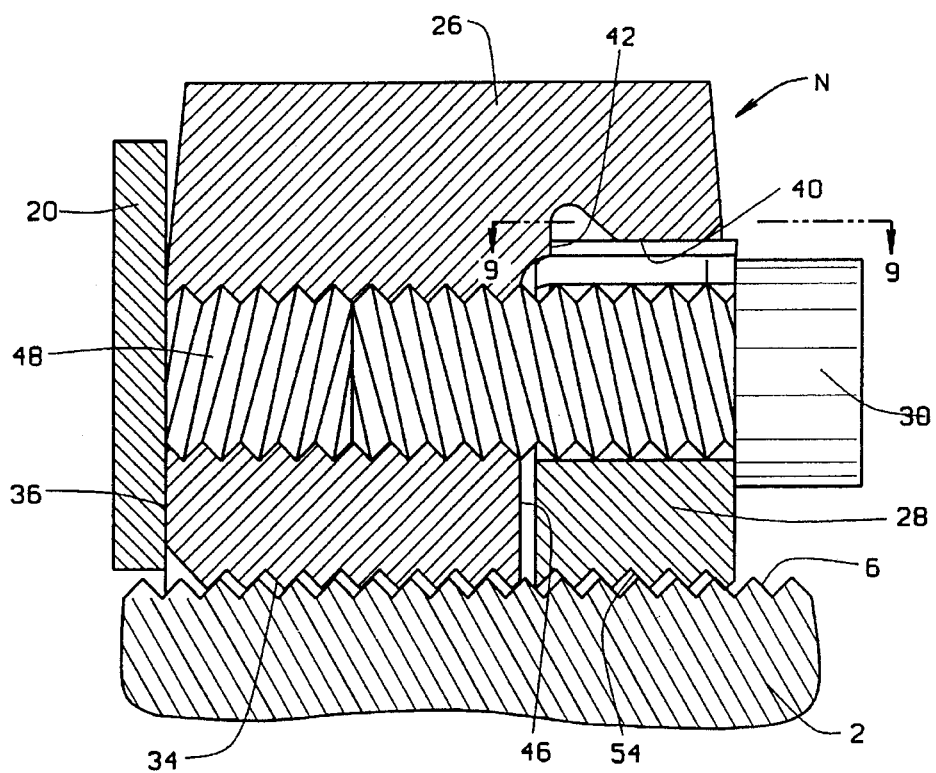
FIG. 8 is a fragmentary view of the locking nut on the spindle with the secondary ring distorted to secure the nut firmly on the spindle.

More specifically, as each cap screw 30 is turned down against the back face 56 of the secondary ring 28, it drives the portion of the ring 28 at the relief 44 where it is located forwardly into the recess 46 of the main ring 26. After all, the diameters v and w of the pads 64 and arcuate surfaces 62, respectively, at the reliefs 60 are less the diameter of the recess 46. But the peripheral surface 50 between the reliefs 60 lies at the greater diameter y and the secondary ring 26 in the regions of peripheral surface 50 bears against the shoulder 42 at the end of the counterbore 40 in the main ring 26. Obviously, the secondary ring 28 in those regions cannot enter the recess 46. As a consequence, the secondary ring 28 transforms from a planar configuration into a slightly undulated configuration (FIG. 9). The deformation caused by the cap screws 30 does not exceed the elastic limits of the steel from which the secondary ring 26 is formed, yet is sufficient to drive the thread 54 in the bore 52 of the secondary ring 28 forwardly against the outboard flanks of the thread 6 on the spindle 2, that is, against the flanks which are presented toward the outboard end of the spindle 2 (FIG. 8). With the thread 34 for the main ring 26 being against the inboard flanks of the external spindle thread 6 and the thread 54 at the deformed portions of the secondary ring 28 being against the outboard flanks of the external thread 6, a clearance no longer exists between the threads 34 and 54 of the nut N and the thread 6 of the spindle 2, and the nut N no longer rotates easily on the spindle 2. In effect, it is jammed.

The bevels on the flanks of the threads 6 and 54 for the spindle 2 and secondary ring 28, respectively, transform the axially directed force applied by the cap screws 30 into radially directed forces in the regions where the thread 54 of the secondary ring 28 contacts the outboard flanks of the spindle thread 6, driving the secondary ring 28 radially outwardly in these regions. But the pads 64 on the secondary ring 28 lie close to the peripheral wall of the recess 46 and prevent excessive radial expansion. Hence, the axial deformation caused by the cap screws 30 is not diminished, and the jamming force is not dissipated.

Since the deformation of the secondary ring 28 lies wholly within the elastic limits of the steel from which the ring 28 is formed, one may bring the nut N back to its original condition simply by backing off the cap screws 30. The secondary ring 28 thereupon reverts to its planar configuration (FIG. 7), and restores the clearance that originally existed between the threads 32 and 52 of the nut N and the thread 6 on the spindle 2. The nut N again rotates easily on the spindle 2.

Perhaps the nut N finds its greatest utility in securing angular bearings with a desired setting. However, it may be used over other threaded spindles and shafts, indeed anywhere where it is desirable to lock a nut over an external thread. Moreover, the reliefs may be on the shoulder 42 of the main ring 26 instead of in the secondary ring 28, in which case the shoulder 42 would be interrupted instead of continuous.

A modified locking nut P (FIGS. 10 and 11) is very similar to the locking nut N in that it has a main ring 76, a secondary ring 78 and cap screws 80 for deforming the secondary ring 78 against the main ring 70. The main ring 76 is essentially the same as the main ring 26, except that it ends at the shoulder 42 and as such does not contain the counterbore 40 and the relief 44. Indeed, the shoulder 42 forms the rear end face of the ring 76. The main ring 76 does contain the center bore 32 as well as the recess 46 which opens out of the shoulder 42. Likewise, it contains the threaded holes 48. The secondary ring 78 is indentical to the secondary ring 28, although it may not have the pads 64. In any event, it includes the peripheral surface 50, arcuate reliefs 60 opening radially out of the surface 50 and U-shaped notches 66 opening radially out of the reliefs 60. It also has the center bore 52. The cap screws 80 do not differ from the cap screws 30.

The secondary ring 78 fits against the shoulder 42 of the main ring 76 with its U-shaped notches 66 aligned with the threaded holes 48 in the main ring 76. When so disposed, the secondary ring 78 is attached to the main ring 76 with fillet-type tack welds 82 located at two locations spaced 180° apart along the peripheral surface 50 of the secondary ring 78. With the two rings 76 and 78 joined at the tack welds 82, the threads 34 and 54 are cut in a single machining operation into the center bores 32 and 52 of the rings 76 and 78, so no disruption in pitch occurs between the threads 34 and 54. Thereafter, the cap screws 80 are inserted through the notches 66 in the secondary ring 78 and engaged with the threads in the threaded holes 48 of the main ring 76.

The modified locking nut P operates essentially the same as the nut N. When the cap screws 80 are turned down tightly against the secondary ring 78, they deform the secondary ring 78 at its arcuate reliefs 60 into the recess 46 of the main ring 76, thereby imparting a somewhat undulated configuration to the secondary ring 78. If the threads 34 and 54 of the nut P are engaged with the external thread 6, the two rings 76 and 78 become jammed on the external thread 6, and this prevents the nut P from turning on the thread 6.

This invention is intended to cover all changes and modifications of the example of the invention herein chosen for purposes of the disclosure which do not constitute departures from the spirit and scope of the invention.

What is claimed is:

1. A locking nut for engaging an external thread, said nut comprising: a first ring having an axis and an axially directed bore along which a thread exists, the first ring also having a shoulder that is oriented at an angle with respect to the axis and a recess that is offset axially into the shoulder; a second ring having an end face that is against the shoulder of the first ring, the second ring also having a relief that opens out of its periphery, the second ring in the region of the relief being aligned with the recess and being small enough to fit into the recess, the second ring also having a bore which is axially aligned with the bore of the first ring and has a thread which matches the thread of the first ring so that there is no interruption in pitch between the threads of the first and second rings when the second ring lies undistorted against the shoulder of the first ring; and a distorting device engaged with the first and second rings and having the capacity to deform the second ring in the region of its relief into the recess of the first ring to thereby interrupt the pitch between the first and second rings, whereby the nut will pass easily over the external thread when the second ring is not deformed, but when the second ring is deformed by the distorting device, the two rings will jam on an external thread and prevent rotation of the nut on the external thread.

2. A locking nut according to claim 1 wherein the first ring has a threaded hole that is offset radially from the bore and the distorting device includes a screw which engages the threaded first ring at the threaded hole and when tightened exerts an axially directed force on the second ring.

3. A locking nut according to claim 2 wherein the screw is a cap screw which passes through the second ring in the region of the relief.

4. A locking nut according to claim 1 in which the relief is one of several arranged symmetrically around the second ring.

5. A locking nut according to claim 1 wherein the first ring contains a counterbore located coaxially with respect to the bore of the first ring, and the recess opens into the counterbore at the shoulder; and wherein the second ring is located in the counterbore of the first ring.

6. A locking nut according to claim 5 wherein an interference fit exists between the second ring and the surface of the counterbore in the first ring.

7. A locking nut according to claim 5 wherein the recess has a circular periphery with its center being the axis of the bore in the first ring; and wherein the second ring along its relief has surfaces which lie inwardly from the periphery of the recess and pads which project outwardly from the surfaces and lie close to the periphery of the recess, so that when the second ring is deformed into the recess in the region of its relief, the pads may engage the peripheral wall of the recess and prevent the second ring from expanding radially.

8. A locking nut according to claim 1 wherein the threads in the first and second rings have multiple convolutions, and the convolutions in the thread of the first ring in number exceed the convolutions in the thread of the second ring.

9. A locking nut for engaging an external thread, said nut comprising: a first ring having a bore which defines an axis and a thread along the bore, the first ring also having an end face at one end of the bore and a counterbore at the other end of the bore, with the counterbore terminating at a shoulder which is generally perpendicular to the axis, the first ring further having a circular recess which surrounds the end of the bore at the counterbore and opens into the counterbore at the shoulder, the first ring also having axially directed holes located around the bore; a second ring located in the counterbore of the first ring and having an end face which is against the shoulder at the end of the counterbore in the first ring, the second ring also having reliefs which open out of its periphery in the region of the holes in the first ring and are defined by surfaces which lie radially inwardly from the periphery of the recess in the first ring, the second ring also having a bore which axially aligns with the bore in the first ring, there being along the bore in the second ring threads which match the threads in the first ring with no interruption in pitch between the threads of the two rings; and cap screws extended into the holes of the first ring where they engage the first ring, the cap screws, when turned down, exerting an axially directed force against the second ring of sufficient magnitude to deform the second ring in the region of its reliefs into the recess of the first ring such that the pitch on the thread of the second ring no longer remains consistent between the two rings.

10. A locking nut according to claim 9 wherein the reliefs are arranged symmetrically on the second ring.

11. A locking nut according to claim 9 wherein the holes in the first ring open out of the recess in the first ring and the cap screws pass through the second ring in the region of its reliefs.

12. A locking ring according to claim 9 wherein the reliefs are defined by surfaces which lie radially inwardly from the periphery of the recess and pads which project radially outwardly from the surfaces and lie close to the periphery of the recess, yet inwardly from that periphery, so that when the screws deform the second rings into the recess in the region of the reliefs, the pads will prevent the second ring from expanding radially.

13. A locking nut according to claim 12 wherein the reliefs and the second ring include notches which open radially out of the second ring, and the cap screws pass through the notches.

14. A locking nut according to claim 11 wherein the holes in the first ring are threaded and the cap screws engage the threads of the holes.

15. A locking nut according to claim 9 wherein the threads in the first and second rings have multiple convolutions, and the convolutions in the thread of the first ring in number exceed the convolutions in the thread of the second ring.

16. A locking nut for engaging an external thread, said nut comprising: a first ring having a bore, which defines an axis, and a thread along the bore, the first ring also having an end face near one end of the bore and a shoulder near the other end of the bore, with the shoulder being generally perpendicular to the axis, the first ring further having a circular recess which surrounds the end of the bore and opens out of the shoulder, the first ring also having axially directed holes located around the bore; a second ring having an end face which is against the shoulder on the first ring, the second ring also having reliefs which open out of its periphery in the region of the holes in the first ring and are defined by margins which lie radially inwardly from the periphery of the recess in the first ring, the second ring also having a bore which axially aligns with the bore in the first ring, there being along the bore in the second ring threads which match the threads in the first ring with no interruption in pitch between the threads of the two rings; and screws extended through the second ring and into the holes of the first ring where they engage the first ring, the screws, when turned down, exerting against the secured ring an axially directed force of sufficient magnitude to deform the second ring in the region of its reliefs into the recess of the first ring such that the pitch on the thread of the second ring no longer remains consistent between the two rings.

17. A locking nut according to claim 16 wherein the threads in the first and second rings have multiple convolutions, and the convolutions in the thread of the first ring in number exceed the convolutions in the thread of the second ring.

18. The locking nut according to claim 16 in combination with an external thread that spirals about an axis and has first flanks presented in one axial direction and second flanks presented in the other axial direction, the external thread extending through the nut where it is engaged with the threads of the first and second rings, the second ring being deformed such that the deformed segment urges the thread of the first ring against the first flanks of the external thread and the thread of the second ring against the second flanks of the external thread, whereby the two rings are jammed on the external thread and inhibit rotation of the nut.

19. The combination according to claim 18 wherein the deformation of the second ring does not exceed the elastic limit of the second ring.

* * * * *